(12) United States Patent
Don et al.

(10) Patent No.: US 9,985,873 B1
(45) Date of Patent: May 29, 2018

(54) DATA STORAGE SYSTEM PROVIDING ASYMMETRIC MULTIPATH STORAGE ACCESS (71) Applicant: EMC Corporation, Hopkinton, MA (US)

(72) Inventors: Arieh Don, Newton, MA (US); Subin George, Framingham, MA (US); Weiqun Li, Shrewsbury, MA (US); Kevin Loehfelm, Wrentham, MA (US); Deepak Vokaliga, Hopkinton, MA (US); Benjamin Yoder, Westborough, MA (US); William Hatstat, Spencer, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 335 days.

(21) Appl. No.: 14/849,938

(22) Filed: Sep. 10, 2015

(51) Int. Cl.
*H04L 12/707* (2013.01)
*H04L 29/08* (2006.01)

(52) U.S. Cl.
CPC .......... *H04L 45/24* (2013.01); *H04L 67/1097* (2013.01)

(58) Field of Classification Search
CPC ........................... H04L 45/24; H04L 67/1097
See application file for complete search history.

(56) References Cited

U.S. PATENT DOCUMENTS

| | | | | |
|---|---|---|---|---|
| 2004/0158668 | A1* | 8/2004 | Golasky | G06F 13/4027 710/315 |
| 2010/0115208 | A1* | 5/2010 | Logan | G06F 3/0611 711/147 |
| 2012/0246345 | A1* | 9/2012 | Contreras | G06F 3/0605 710/5 |
| 2015/0347057 | A1* | 12/2015 | Busick | G06F 3/0659 710/74 |

OTHER PUBLICATIONS

ANSI, SCSI-2 Specification, archived on Apr. 8, 2002, retrieved from https://web.archive.org/web/20020608175214/http://ldkelley.com:80/SCSI2/SCSI2/SCSI2-08.html on Sep. 28, 2017, 67 Pages.*

* cited by examiner

*Primary Examiner* — Tim T Vo
*Assistant Examiner* — Herve Iradukunda
(74) *Attorney, Agent, or Firm* — BainwoodHuang (57) ABSTRACT

A data storage system provides asymmetric multi-path access to a storage device from a host computer using a storage protocol such as SCSI. Device state information is maintained indicating that one path of set of paths between the host computer and the storage device is a non-fully-functional path. In response to receiving device discovery commands from the host computer on the one path and the one path being indicated to be a non-fully-functional path, the data storage system returns respective good responses indicating that the storage device is accessible to the host computer via the non-fully-functional path. However, in response to receiving a test unit readiness command from the host computer on the one path and the one path being (Continued)

indicated to be a non-fully-functional path, an error response is returned which causes the host computer to select an alternative path of the set of paths for the data transfer.

10 Claims, 4 Drawing Sheets

|  | PRIMARY ARRAY 12-1 | | SECONDARY ARRAY 12-2 | |
| --- | --- | --- | --- | --- |
|  | DISCOVERY | TEST UNIT READINESS | DISCOVERY | TEST UNIT READINESS |
| ACTIVE-ACTIVE: | GOOD | GOOD | GOOD | GOOD |
| ACTIVE-PASSIVE: | GOOD | GOOD | GOOD | CHECK – ILLEGAL (L-N-S) |

DATA STORAGE SYSTEM PROVIDING ASYMMETRIC MULTIPATH STORAGE ACCESS

SUMMARY

The invention is related to the field of data storage systems, and in particular to clustered data storage systems selectively providing multipath access to units of storage.

In storage clusters, a unit of storage (referred to as a "storage device" or simply "device" herein) may be hosted on multiple data storage systems, also referred to as "data storage arrays" or "arrays" herein. In one example, a cluster of two storage arrays is described, but the technique is extendible to larger clusters. The storage device may be in "active-active" (A/A) mode or in "active-passive" (A/P) mode. A/A means that the device is active and can be the target of read and write I/O commands (I/Os) on both arrays. A/P means that the device is the target of I/Os on one array only, i.e., the "active" array. The other array ("passive" array) is not performing I/Os to the device. Thus, A/P mode exhibits asymmetric host access, i.e., access on only some of the paths to the data storage device.

The above operation assumes the existence of separate paths for I/Os between one or more host computers (hosts) and the arrays. In this context a "path" is defined at the level of the storage protocol, e.g., SCSI, that is used to convey storage commands and responses. In particular, a path corresponds to a unique "I-T-L" triplet, where I refers to Initiator (e.g. host port), T refers to Target (e.g., array port), and L refers to LUN, i.e., an identifier of the target storage device. In a common case a host may implement a multipathing technique in which the host selects from among a set of candidate paths to a given device. During A/A operation, all paths are normally available for use. The host may implement load balancing, parallel concurrent access, and/or other schemes exploiting the multipathing capability. During A/P operation, the host may be constrained to use only the path(s) to one array.

Although the set of paths extend to separate arrays, the host may be unaware of this at the relevant level of operation. That is, the host sees only a storage device and four paths to it; it does not see the intermediate components such as the distinct arrays along the paths. As a result, any array-specific behavior that occurs on the paths may not be correctly interpreted by the host. As an example, it is generally required that a device have the same Ready or Not Ready status as seen from any path to that device. If the host were to receive a Not Ready response on one path by some operation of the array to which the path extends, the host might conclude that the device is not accessible at all, rather than understanding the array-specific behavior and retrying the operation on a different path that might extend to a different array. For example, if a device returns Not Ready status on one path, the host may assume that the device is Not Ready via any path, and fail I/Os directed to the device. This kind of host behavior can be problematic in a clustered storage environment in which there is a need to signal legitimate, non-error, path-specific dependencies, such as a device being in A/P mode and thus not accessible via some paths.

There is a new extension to the SCSI protocol that can be used for such purposes. The extension is referred to as ALUA, an acronym for Asymmetric Logical Unit Access. An ALUA-compatible device can indicate different readiness on different paths, and an ALUA-compatible host properly interprets and acts on such differential indications. ALUA can be used to smoothly transition a system between A/A and A/P operation, for example, without requiring that hosts be re-started so as to reset their path information. However, ALUA is not supported by all hosts that might be deployed in a clustered storage environment, and such non-support may continue for some time if not indefinitely into the future.

The present disclosure is directed to a method of operating a storage array that can provide path-specific information without causing a host to misinterpret responses and take inappropriately drastic action such as declaring a path dead for all time. The technique assumes that a host responds in a softer or less drastic way to certain standard-compliant indications, and these indications are selectively used to induce desired host behavior with respect to path usage. The technique can be used, for example, to manage transitions between A/A and A/P access modes of a storage device.

A method is described of operating a data storage system to provide asymmetric multi-path access to a storage device from a host computer using a storage protocol, such as SCSI in one example. The storage protocol has device discovery commands and a test unit readiness command, where the device discovery commands request identification of the storage device and device data thereof, and the test unit readiness command is issued prior to a data transfer for determining an ability of the storage device to engage in a transfer of data with the host computer. The storage protocol also has responses including a good response, a not ready response, and an error response. The not ready response indicates that a target of a command is not accessible to the host computer, and the error response indicates that an accessible target of a command has a current state prohibiting processing the command.

The method includes maintaining device state information indicating that one path of set of paths between the host computer and the storage device is a non-fully-functional path. In response to receiving the device discovery commands from the host computer on the one path and the one path being indicated to be a non-fully-functional path, the data storage system returns respective good responses indicating that the storage device is accessible to the host computer via the non-fully-functional path. However, in response to receiving the test unit readiness command from the host computer on the one path and the one path being indicated to be a non-fully-functional path, the error response is returned to cause the host computer to select an alternative path of the set of paths for the data transfer.

Generally, the method can cause a host to select another path to use for the specific transfer of data following the test unit readiness command, and perhaps to avoid using the one path for some period. But the host does not declare either the storage device or the path itself dead, as it might if it received a Not Ready response to the device discovery commands or the test unit readiness command. After a period of time has elapsed, the host may attempt to use the one path again, and if the storage device has become usable via that path (e.g., due to a transition from A/P to A/A mode), then the data storage array will respond with a normal response and the transfer will be completed successfully. The host may then mark the one path as usable for future accesses to the storage device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
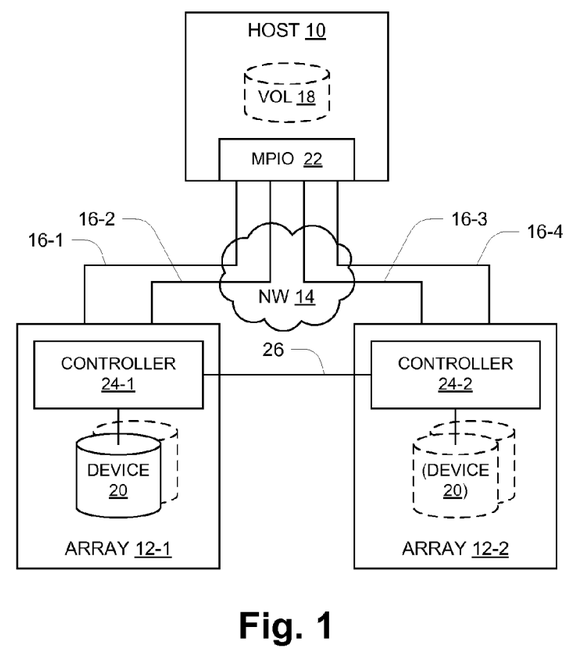
FIG. 1 is a block diagram of a data processing system.

FIG. 1 shows a data processing system including a host computer (HOST) 10 coupled to data storage systems, also referred to as data storage arrays (ARRAYs) 12-1, 12-2, by a set of connections shown generally as a network (NW) 14. The network 14 may be realized using any of a variety of physical-layer schemes and components as generally known to those in the art, e.g., FibreChannel, Ethernet, etc. The network 14 may implement any of a variety of organizations or architectures as generally known in the art, e.g., direct-attached storage, storage-area network (SAN), iSCSI, etc. The network 14 also supports a logical layer for detailed storage-oriented communications, which in one embodiment is the Small Computer Systems Interconnect (SCSI) protocol. In the illustrated example, the network 14 supports four distinct paths 16, shown as 16-1 through 16-4 and defined at the SCSI layer, via which a logical unit of storage can be accessed by the host 10, as described more below.

At the host 10, a logical volume (VOL) 18 of storage is defined for which the arrays 12 provide underlying physical storage. Specifically, underlying storage is provided at least in part by a storage device (DEVICE) 20 located in at least the array 12-1. Other storage devices in the arrays 12 are indicated in phantom. The host 10 implements a so-called multipathing scheme for accessing the device 20 over a selected one of the paths 16. The multipathing logic, which may be realized in any of a variety of ways as generally known in the art, is represented generically as multipath input/output (MPIO) 22. Each array 12 includes a respective controller 24 (24-1, 24-2) that performs storage operations in response to storage commands from the host 10. As shown, a connection 26 extends between the controllers 24 for selected transfer of commands and responses, as described more below.

Generally from the perspective of the hosts 10, the storage device 20 appears to be present at each of the arrays 12, although it may or may not be accessible at a given time depending on operating mode, as described more below. In one embodiment, one instance of the storage device 20 is stored on only one array, such as at array 12-1 as shown, and this one instance is accessed by other arrays to satisfy host commands received at the other arrays. Thus a host command received at array 12-2 is forwarded to array 12-1 via the connection 26, and the response is routed from array 12-1 to array 12-2 for forwarding on to the host. This arrangement may be referred to as a "pass-through" arrangement. In another arrangement, each array 12 stores a respective copy of the storage device 20, and the copies are kept in synchronization (identical contents) by replicating changes (e.g., writes) to all copies. For clarity of description, the "pass-through" arrangement is assumed herein, but it will be understood that there is no loss of generality and that the presently disclosed technique is usable in the multiple-copy arrangement as well.

The paths 16 have both physical and logical components. Generally, each path 16 corresponds to a specific triplet I-T-L, for "Initiator", "Target" and "LUN". In SCSI parlance, an initiator is an endpoint issuing SCSI commands and receiving SCSI responses, and a target is a SCSI endpoint receiving SCSI commands and sending SCSI responses. These commonly map to hardware ports of a respective endpoint device. Thus in FIG. 1, the host 10 may be connected to the network 14 by one or more hardware ports, each having a distinct SCSI initiator address. Hardware ports may be realized by FibreChannel host bus adaptors, for example. Similarly, each array 12 is connected to the network 14 by one or more respective hardware ports, each having a distinct SCSI target address. A LUN is a unit of storage addressable at the SCSI level. In the present description the storage device 20 is a LUN, and as such can be the target of a SCSI command from the host computer 10.

In the example of FIG. 1, the four paths 16 to the storage device 20 traverse respective sets of components as follows:

16-1: port of host 10, NW 14, port of array 12-1, controller 24-1

16-2: port of host 10, NW 14, port of array 12-1, controller 24-1

16-3: port of host 10, NW 14, port of array 12-2, controller 24-2, connection 26, controller 24-1

16-4: port of host 10, NW 14, port of array 12-2, controller 24-2, connection 26, controller 24-1

For the pass-through example described herein, the array 12-1 on which the storage device 20 resides is also referred to herein as the "primary" array, while the other array 12-2 is also referred to as the "secondary" array.

Figure 2:
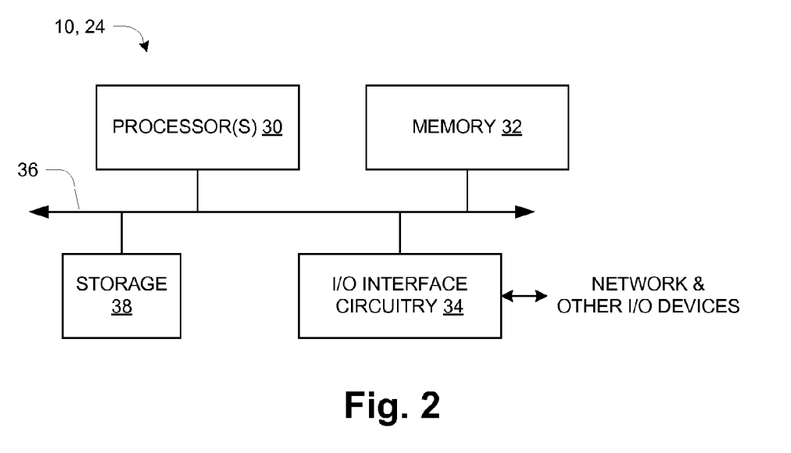
FIG. 2 is a block diagram of a computer from a hardware perspective.

FIG. 2 shows an example configuration of a computer such as a host 10 and controller 24 from a computer hardware perspective. The hardware includes one or more processors 30, memory 32, and interface circuitry 34 interconnected by data interconnections 36 such as one or more high-speed data buses. The interface circuitry 34 provides a hardware connection to the network 14 (FIG. 1) and perhaps other I/O devices, which for controller 24 includes the local storage devices and connection 26. The processor(s) 30 with connected memory 32 may also be referred to as "processing circuitry" herein. For the host 10, there may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a storage controller application, for example, can be referred to as a storage controller circuit or storage controller component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

As outlined above, a given unit of storage such as storage device 20 may be configured for either Active-Active (A/A) access or Active-Passive (A/P) access. In the present context, A/A access refers to the ability to access the storage device 20 via either array 12-1 or 12-2. From the perspective of the host 10, this means the ability to use any of the paths 16, including those extending to the secondary array 12-2.

Both the primary array 12-1 and the secondary array 12-2 respond to writes and reads to/from the storage device 20, with the primary array 12-1 accessing the storage device 20 locally and the secondary array 12-2 accessing the storage device 20 via the connection 26 and controller 24-1 of the primary array 12-1. In contrast, A/P access refers to the ability to access the storage device 20 via only one array 12, for example the primary array 12-1. From the perspective of the host 10, this means that access is restricted to only a subset of the paths 16, such as paths 16-1 and 16-2, for example. This is an example of asymmetric access, as noted above.

In an A/A-A/P use case, as well as others, it may be desired to maintain the ability of a host 10 to use a path at some point in the future even though it cannot be used at present. This capability could support transitioning from A/P access mode to A/A access mode, for example. Keeping the path available for potential future use is in contrast to making the path unusable indefinitely, which would require some drastic action such as a system re-start before the host 10 might try to use it. As mentioned above, the recently developed ALUA extension of SCSI directly and explicitly supports the desired behavior, i.e., making paths only temporarily unavailable for accessing a unit of storage. However, a host 10 may not support ALUA for a variety of reasons, including for example that it is an older machine running older software. Alternatively, the host 10 may support ALUA, but for some reason the storage device 20 is not configured to use it. The presently disclosed technique can provide a way to obtain desired behavior even when ALUA is not supported or otherwise in use.

It should be noted that information describing the access state of the storage device 20 will generally be maintained at each controller 24, i.e., stored in memory or non-volatile storage of (or accessible to) the respective controller 24. When the storage device 20 is in the A/P access state, certain paths may be referred to as "non-fully-functional", meaning that they exist and are maintained but cannot currently be used for data transfers. This is in contrast to other paths which are "fully functional" paths, which are currently usable for data transfers. In an example used herein, the paths 16-1 and 16-2 are assume to remain fully functional, while the paths 16-3 and 16-4 may transition between fully functional and non-fully functional. Those skilled in the art will appreciate that the opposite scenario is possible, i.e., that the paths 16-3 and 16-3 remain fully functional and the paths 16-1 and 16-3 transition between fully functional and non-fully functional.

Figure 3:
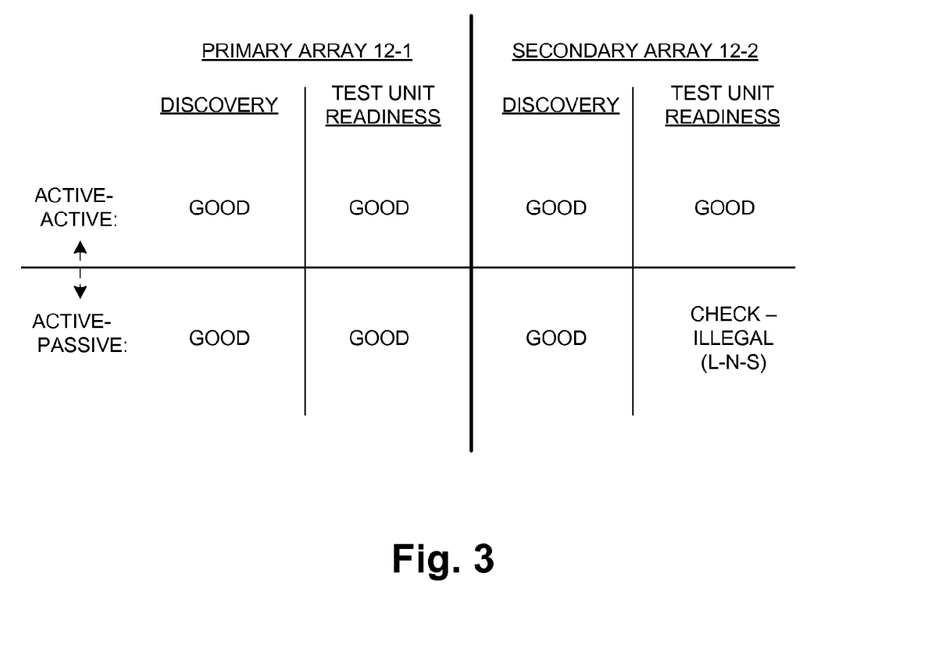
FIG. 3 is a matrix depicting responses of a storage array to different types of commands under different operating conditions.

FIG. 3 is a matrix used to explain pertinent high-level operation of the system, in particular pertinent operation of the arrays 12 to achieve asymmetric operation without use of ALUA. The technique assumes only that a host 10 will react to certain patterns of response from the arrays 12 in certain known and predictable ways. The matrix presents the responses of the primary array 12-1 and secondary array 12-2 to different types of SCSI commands directed to the storage device 20, based on the current access state (A/A or A/P). More particularly, the command types are divided between "device discovery" commands and a "test unit readiness" command. Examples of the device discovery commands in SCSI are Inquiry and Report LUNs, which are used for general setup and control functions and not in the context of specific data transfers. An example of a test unit readiness command in SCSI is Test Unit Ready or TUR, which is issued by an initiator (e.g., host 10) just prior to each data transfer (Read or Write) to confirm that the target LUN (e.g., storage device 20) is ready for the imminent transfer.

As shown, when the device 20 is in A/A access mode, both the primary array 12-1 and the secondary array 12-2 return a Good response for both the discovery commands as well as the test unit readiness command. Thus from the perspective of the host 10 the device 20 is equally accessible from any path 16, which is as desired. When the device 20 is in A/P access mode, the primary array 12-1 operates in the same manner, i.e., returning a Good response for both discovery commands and the test unit readiness command. However, the secondary array 12-2 treats the command types differently. For the discovery commands, a Good response is returned, but for the test unit readiness command, an certain type of error response is returned. In one example pertinent to SCSI, the error response is a response with a "Check Condition" status and qualifiers including a sense key with a value indicating "Illegal Request", and a code indicating "LUN Not Supported" (L-N-S) as the reason for the illegality of the request/command. This error response is also returned in response to Read and Write commands, if for some reason a host 10 issues one of these even after receiving an error response to a TUR command.

The behavior described in FIG. 3 effectively causes the desired A/A or A/P behavior in the host 10. This is readily apparent in the A/A case as already mentioned. In the A/P case, the host 10 observes the primary array 12-1 as providing read/write access to the storage device 20 based on the Good response to TUR, and thus maintains the paths 16-1 and 16-2 as available for use for transfer-type commands such as Read and Write. However, the host 10 observes something different on the paths 16-3, 16-4 to the secondary array 12-2. The Good response to the discovery commands essentially tells the host 10 that the storage device 20 is defined and visible on these paths. But the Check Condition (L-N-S) response to the test unit readiness command on this path indicates that the storage device 20 is not accessible via this path for this particular access. This path is thus not fully functional with respect to the storage device 20. In this case, the host 10 uses another path for this access as well as subsequent accesses, but this condition is treated as only temporary rather than permanent. In many cases the host 10 will wait for some period, e.g. on the order of minutes, and then attempt to use the path again. In a system supporting dynamic transition between A/A and A/P access of storage units, this is desirable behavior. If the storage device 20 transitions to A/A access in the interim, then on a subsequent access the secondary array 12-2 will instead provide the Good response and the path will be used for write and read transfers as desired.

Figure 4:
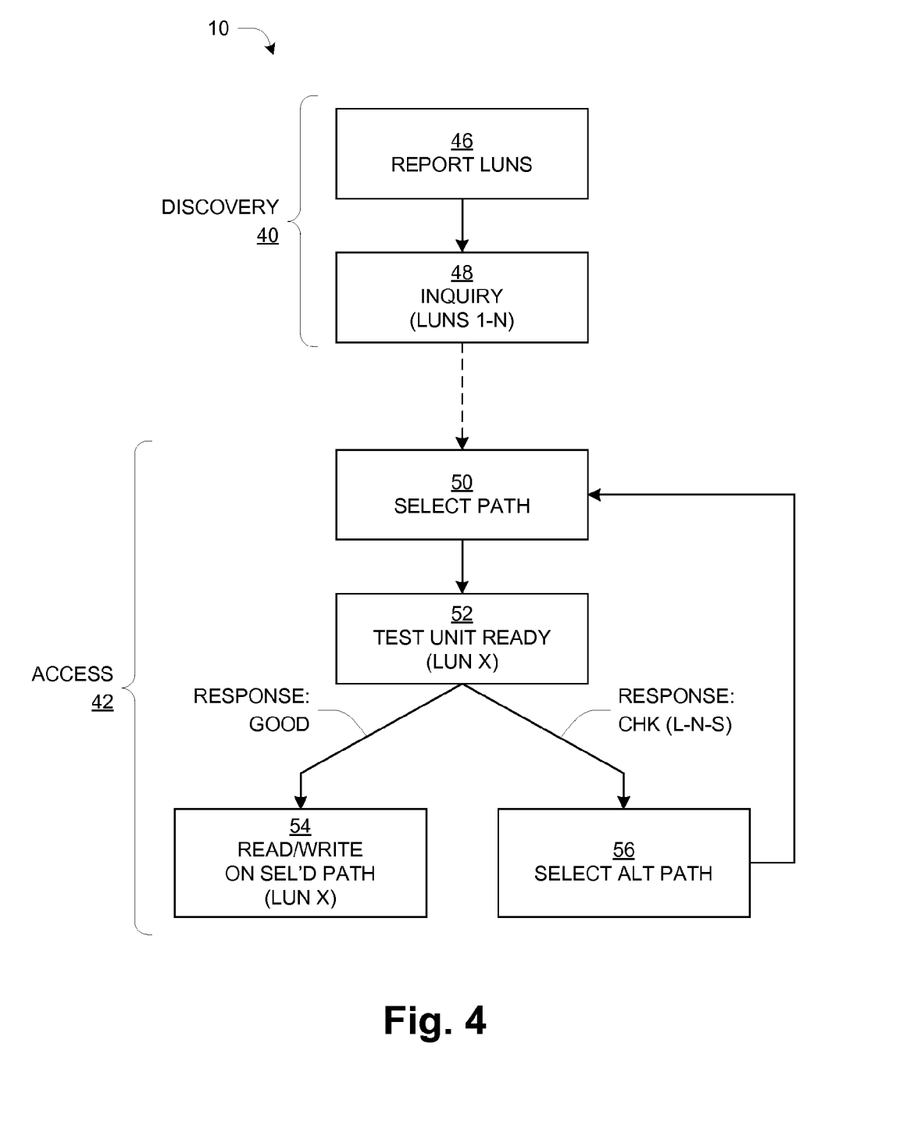
FIG. 4 is a flow diagram of operation of a host computer.
Figure 5:
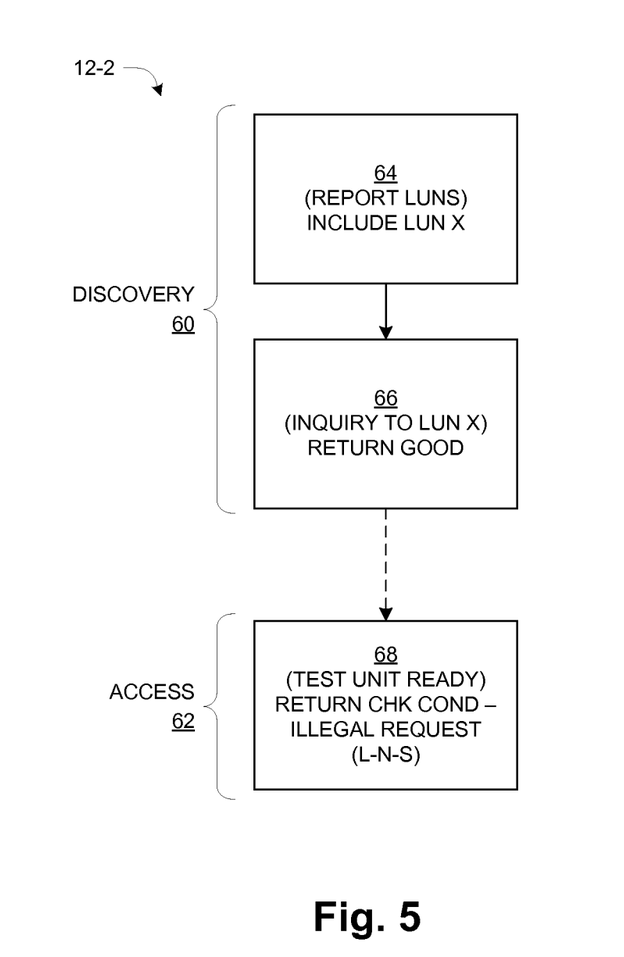
FIG. 5 is a flow diagram of operation of a storage array.

FIGS. 4 and 5 depict specific operations of the host 10 and array 12-2 respectively to realize the overall scheme described above with reference to FIG. 3.

FIG. 4 shows pertinent operation of the host 10, specifically of the path-aware component such as MPIO 22. Operation includes two distinct aspects identified as discovery 40 and access 42. In discovery operation 40, the host 10 issues device discovery commands, such as Inquiry and Report LUNs in the SCSI protocol, to the arrays 12 to obtain information about host-accessible LUNs. The host 10 issues these commands and receives corresponding responses for all Initiator-Target pairs, i.e., for each connected pair of host and array ports. In access operation 42, the host 10 issues SCSI commands such as Read and Write for transferring data between the host 10 and a specified LUN. These commands and their corresponding responses are issued on only individual paths as selected by the MPIO 22. In the illustrated example, it is assumed that the device 20 is identified as "LUN X" in all pertinent SCSI commands.

More specifically, during discovery operation 40, at 46 the host 10 may first issue a Report LUNs command to a particular port of an array 12. The array 12 responds to the Report LUNs command with an identification of all LUNs that can be accessed via the array port at which the Report LUNs command is received. Then at 48 the host 10 issues respective Inquiry commands to the identified LUNs 1-N on each of the paths 16. Both the array 12-1 and the array 12-2 return GOOD responses to the Inquiry commands directed to LUN X, i.e., for storage device 20. It is assumed in this example that a GOOD response is returned to Inquiry commands received on all paths 16 (i.e., at both ports of both arrays 12), so that the MPIO 22 establishes the four paths 16-1 through 16-4 by which the storage device 20 may be accessed.

Access operation 42 occurs when the host 10 writes or reads data to/from the storage device 20. Such access to the storage device 20 is generally in response to corresponding internal access (by an application or other host software) to the volume 18, although with offsets or differences of timing and transfer size if there is caching or other buffering within the host 10.

At 50, the MPIO 22 initially selects one of the four paths 16 for the access, and at 52 issues a Test Unit Ready command to the target LUN X on the selected path. Subsequent operation depends on the response, and two scenarios are described. If the host 10 receives a Good response, then at 54 the host 10 issues the Read or Write command on the selected path. As outlined above, this operation can occur in a couple of different ways. One such way is when the selected path is one of the paths 16-1 or 16-2 extending to the primary array 12-1 for the storage device 20. Another way is when the selected path is one of the paths 16-3 or 16-4 extending to the secondary array 12-2 and the storage device 20 is in the A-A access mode.

If at 52 the host 10 instead receives a certain type of error response, then at 56 the host 10 selects an alternative path and returns to 50 to retry operation with the newly selected path. In one embodiment, the error response is the Check Condition response with an L-N-S sense code as outlined above. This operation can occur in a scenario in which the storage device 20 is in A/P access mode and the path initially selected at 50 is one of the non-fully-functional paths 16-3 or 16-4 extending to the secondary array 12-2.

It should be noted that the access operation 42 shown in FIG. 4 is not necessarily repeated in its entirety for each Read or Write to be performed. As mentioned above, upon receiving a L-N-S Check Condition for a given path, the host 10 may treat the path for some period into the future, and thus for subsequent Reads and Writes the initial selection at 50 will not attempt to use the path and therefore not receive another Check Condition on that path. Once a period of time has gone by or some other condition is satisfied, the host 10 will retry use of the path, e.g., by making it available during the initial path selection at 50. The host 10 may monitor the path over some longer interval and at some point declare the path dead if it has not been used successfully.

It will be appreciated that in the above process there may be a case in which no Good response is received for any path 16. Depending on the capability of the host 10, this may cause an application or even the entire host to "crash", i.e., terminate operation in a non-graceful manner. Alternatively, a host 10 may implement logic to handle such a case more gracefully. Such logic is omitted in the interest of clarity and ease of description.

FIG. 5 shows pertinent operation of the array 12-2 when the storage device 20 is in A/P access mode. Discovery and access operations 60, 62 are shown, corresponding to discovery and access operations 40, 42 of the host 10 (FIG. 4). At 64, in response to receiving a Report LUNs command from host 10, the array 12-2 returns a response with a Good status and a listing of accessible LUNs (e.g., 1-N) that includes LUN X (i.e., storage device 20 hosted from both arrays 12-1, 12-2). At 66, in response to receiving an Inquiry command from host 10 directed to LUN X, the array 12-2 returns a corresponding response with a Good status indicator. At a later time during access operation 62, at 68 the array 12-2 receives a Test Unit Ready command directed to LUN X and, because LUN X has A/P access status, returns a response with Check Condition (CHK COND) status, a sense key of Illegal Request and a sense code indicating LUN Not Supported (L-N-S). As noted, this response is also returned in the case of a Read or Write from the host 10. The host 10 reacts as described above, i.e., refrains from using the path for this transfer and perhaps additional transfers over some period. No Read or Write is received during such period. The host 10 attempts to use the path again at some later time.

Although in the above description the path-specific behavior is based on which of a set of storage arrays 12 the paths extend to, in alternative embodiments the system may be configured differently and employ different criteria for distinguishing the paths. As an example, there may be a use case such as load balancing, for example, in which a single array 12 might use a process like that of FIG. 4 with respect to a set of ports of that array, to induce a host to use one of the ports versus another.

As mentioned above, the disclosed technique may be used even by a data storage system 12 that also supports ALUA to provide asymmetric access to ALUA-compliant hosts. In this case the disclosed technique is used to provide asymmetric access to other, non-ALUA-compliant hosts. Thus the disclosed technique may be used in parallel with an ALUA-based mechanism for the ALUA-compliant hosts. An ALUA-based mechanism might include maintaining second device state information indicating that one path of a second set of paths between the ALUA-compliant host and a second storage device of the array is an unavailable path, as distinct from a separate available path extending to a separate array that owns the second storage device. In response to receiving a second test unit readiness command from the ALUA-compliant host on the one path, and the one path being indicated to be an unavailable path, a good response is returned along with ALUA information explicitly indicating that the one path is an unavailable path. The ALUA-compliant host uses the information to make an alternative path selection.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system to provide asymmetric multi-path access to a storage device from a host computer using a storage protocol, the storage protocol having device discovery commands and a test unit readiness command, the device discovery commands requesting identification of the storage device and device data thereof, the test unit readiness command being issued prior to a data transfer for determining an ability of the storage device to engage in a transfer of data with the host computer, the storage protocol also having responses including a good response, a not ready response, and an error response, the not ready response indicating that a target of a command is not accessible to the host computer, the error response indicating that an accessible target of a command has a current state prohibiting processing the command, the method comprising:

maintaining device state information indicating that a first path of a set of paths between the host computer and the storage device is a non-fully-functional path;

in response to receiving the device discovery commands from the host computer on the first path and the first path being indicated to be a non-fully-functional path, returning respective good responses indicating that the storage device is accessible to the host computer via the first path; and     in response to receiving the test unit readiness command from the host computer on the first path and the first path being indicated to be a non-fully-functional path, returning the error response to cause the host computer to select an alternative path of the set of paths for the data transfer,     wherein the above method steps are performed on a first basis in which the host computer is a non-compliant host computer lacking support for an explicit asymmetric-access extension of the storage protocol, and the method is used in conjunction with second method steps performed on a second basis in which a second host computer is a compliant host computer having support for the explicit asymmetric-access extension, the second method steps including:

maintaining second device state information indicating that one path of a second set of paths between the second host computer and a second storage device is an unavailable path as distinct from a separate available path extending to an owning one of the data storage systems; and         in response to receiving a second test unit readiness command from the second host computer on the one path of the second set of paths and the one path being indicated to be an unavailable path, returning a good response with information of the explicit asymmetric-access extension explicitly indicating that the one path is an unavailable path.

2. The method of claim 1, wherein the data storage system is a first one of a cluster of data storage systems providing host access to the data storage device, the paths extending to respective ones of the data storage systems.

3. The method of claim 2, wherein the host access is according to an active-passive access mode in which the data storage device is visible to the host computer via each of the data storage systems but is accessible to the host computer for data transfers via only an active one of the data storage systems, and wherein the first one of the data storage systems is a passive data storage system via which the storage device is not presently accessible to the host computer for data transfers.

4. The method of claim 3, wherein the host access includes (i) first host access in the active-passive access mode, and (ii) second host access in an active-active access mode in which the data storage device is both visible and accessible to the host computer for data transfers via each of the data storage systems, and further including, in the active-active access mode:

maintaining the device state information to indicate that the first path is a fully-functional path; and     in response to receiving the test unit readiness command from the host computer on the first path and the first path being indicated to be a fully-functional path, returning the good response indicating that the storage device is accessible to the host computer via the first path.

5. The method of claim 1, wherein the error response includes:

a check condition status in lieu of a good status included in the good response;

a first qualifier indicating that the test unit readiness command is an illegal command; and     a second qualifier indicating a device-not-supported basis for illegality of the test unit readiness command.

6. A data storage system operative to provide asymmetric multi-path access to a storage device from a host computer using a storage protocol, the storage protocol having device discovery commands and a test unit readiness command, the device discovery commands requesting identification of the storage device and device data thereof, the test unit readiness command being issued prior to a data transfer for determining an ability of the storage device to engage in a transfer of data with the host computer, the storage protocol also having responses including a good response, a not ready response, and an error response, the not ready response indicating that a target of a command is not accessible to the host computer, the error response indicating that an accessible target of a command has a current state prohibiting processing the command, the data storage system comprising:

one or more processors;

memory coupled to the processors; and input/output interface circuitry coupled to the memory and the processors,     the memory storing computer program instructions which, when executed by the processors, cause the data storage system to perform a method including:

maintaining device state information indicating that a first path of a set of paths between the host computer and the storage device is a non-fully-functional path;

in response to receiving the device discovery commands from the host computer on the first path and the first path being indicated to be a non-fully-functional path, returning respective good responses indicating that the storage device is accessible to the host computer via the first path; and         in response to receiving the test unit readiness command from the host computer on the first path and the first path being indicated to be a non-fully-functional path, returning the error response to cause the host computer to select an alternative path of the set of paths for the data transfer,     wherein the above method of the data storage system is performed on a first basis in which the host computer is a non-compliant host computer lacking support for an explicit asymmetric-access extension of the storage protocol, and wherein the computer program instructions cause the data storage system to perform the method along with second method steps performed on a second basis in which a second host computer is a compliant host computer having support for the explicit asymmetric-access extension, the second method steps including:

maintaining second device state information indicating that one path of a second set of paths between the second host computer and a second storage device is an unavailable path as distinct from a separate available path extending to an owning one of the data storage systems; and in response to receiving a second test unit readiness command from the second host computer on the one path of the second set of paths and the one path being indicated to be an unavailable path, returning a good response with information of the explicit asymmetric-access extension explicitly indicating that the one path is an unavailable path.

7. The data storage system of claim 6, wherein the data storage system is a first one of a cluster of data storage systems providing host access to the data storage device, the paths extending to respective ones of the data storage systems.

8. The data storage system of claim 7, wherein the host access is according to an active-passive access mode in which the data storage device is visible to the host computer via each of the data storage systems but is accessible to the host computer for data transfers via only an active one of the data storage systems, and wherein the first one of the data storage systems is a passive data storage system via which the storage device is not presently accessible to the host computer for data transfers.

9. The data storage system of claim 8, wherein the host access includes (i) first host access in the active-passive access mode, and (ii) second host access in an active-active access mode in which the data storage device is both visible and accessible to the host computer for data transfers via each of the data storage systems, and wherein the method further includes, in the active-active access mode:

maintaining the device state information to indicate that the first path is a fully-functional path; and in response to receiving the test unit readiness command from the host computer on the first path and the first path being indicated to be a fully-functional path, returning the good response indicating that the storage device is accessible to the host computer via the first path.

10. The data storage system of claim 6, wherein the error response includes:

a check condition status in lieu of a good status included in the good response;

a first qualifier indicating that the test unit readiness command is an illegal command; and a second qualifier indicating a device-not-supported basis for illegality of the test unit readiness command.

\* \* \* \* \*